Nov. 14, 1933.　　　F. J. FISCHER　　　1,935,182
HIGH VOLTAGE WINDING
Filed May 7, 1931　　　2 Sheets-Sheet 1
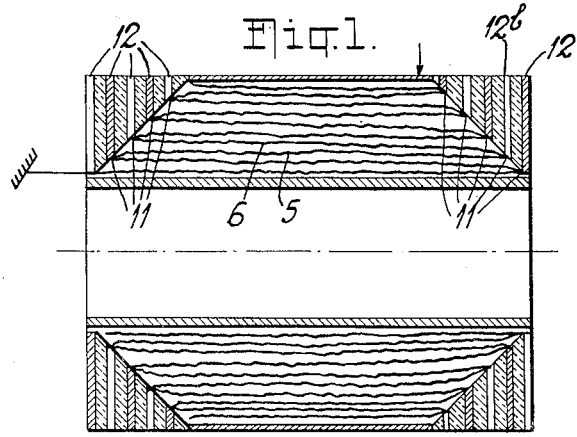
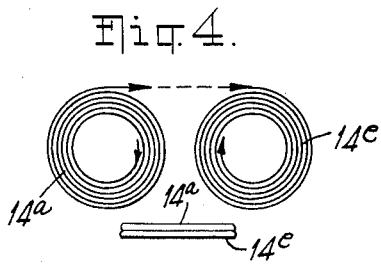
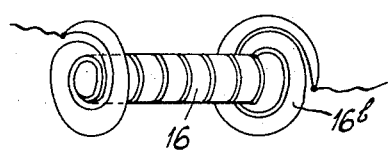
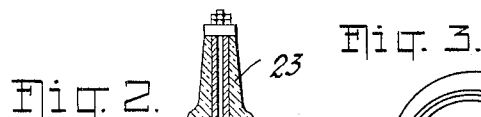
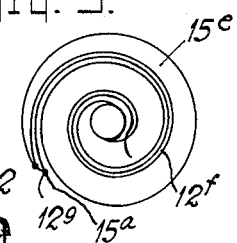
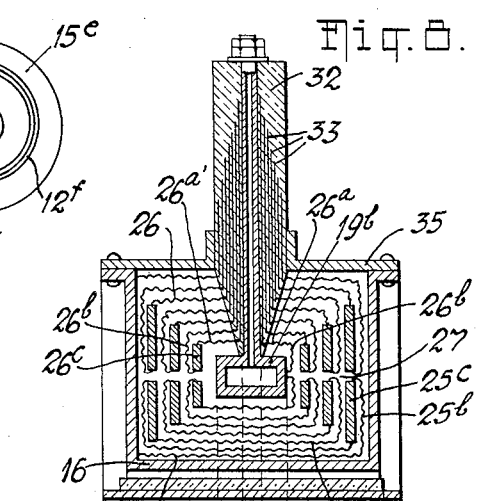
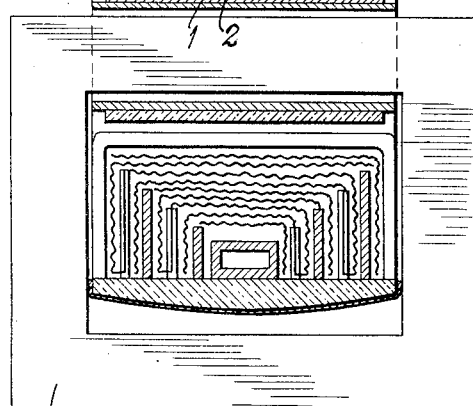
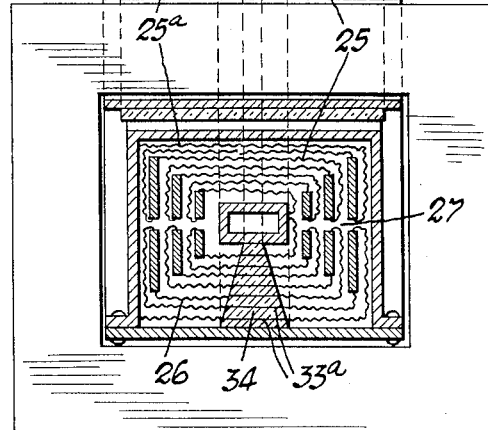
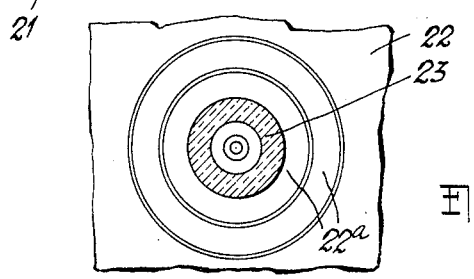
INVENTOR
FRANZ J. FISCHER
BY
Richards+Geier
ATTORNEYS Nov. 14, 1933.   F. J. FISCHER   1,935,182
HIGH VOLTAGE WINDING
Filed May 7, 1931   2 Sheets-Sheet 2
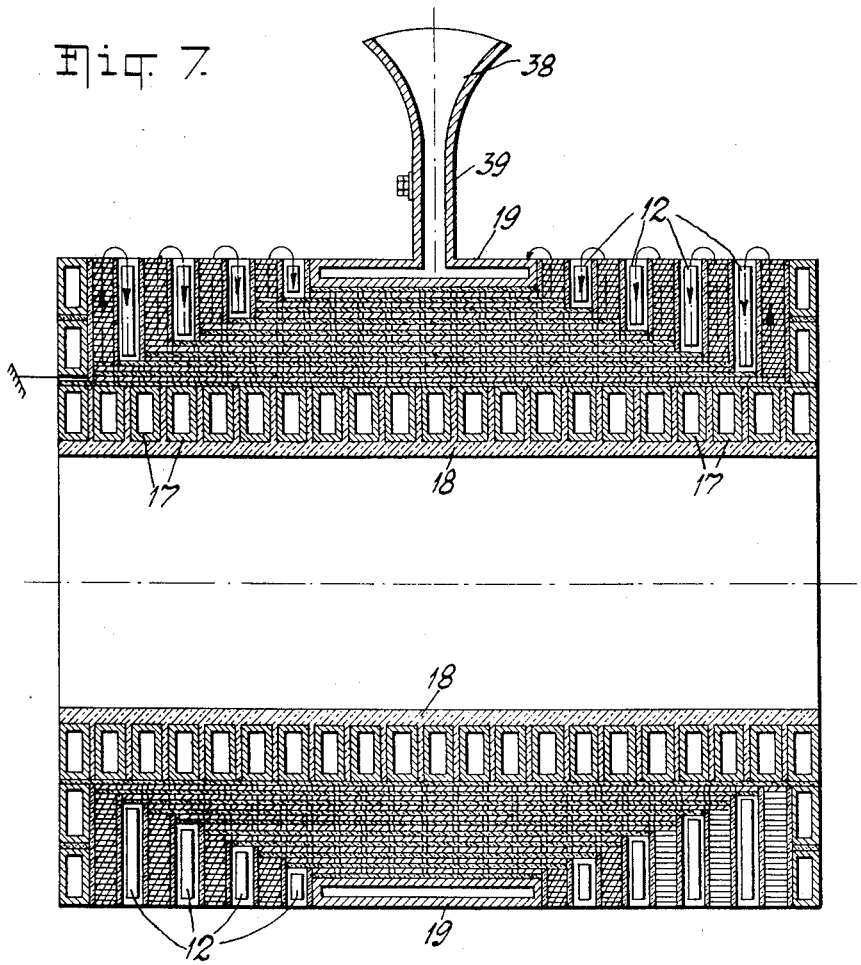
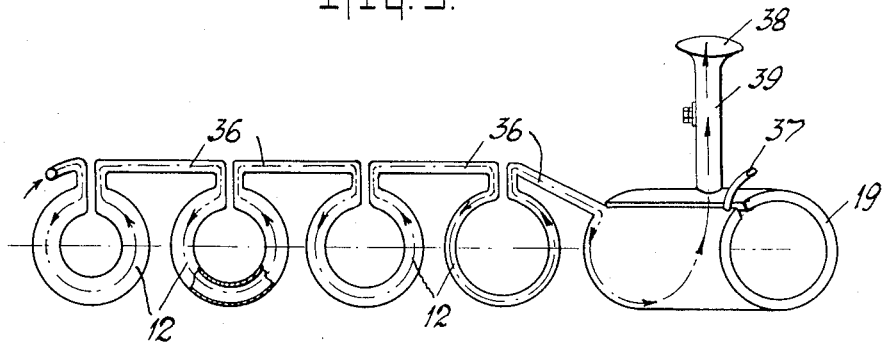
INVENTOR
FRANZ J. FISCHER
BY
Richard + Geier
ATTORNEYS Patented Nov. 14, 1933

1,935,182

UNITED STATES PATENT OFFICE 1,935,182

HIGH VOLTAGE WINDING

Franz Joseph Fischer, Dresden, Germany, assignor to Koch & Sterzel Aktiengesellschaft, Dresden, Germany, a corporation of Germany Application May 7, 1931, Serial No. 535,619, and in Germany April 17, 1930

16 Claims. (Cl. 175—356)

This invention relates to improvements in high voltage windings and refers more particularly to coils for transformers, choking coils and measuring instruments.

High voltage coils are known wherein the voltage is radially distributed and such coils must have a certain minimum height at their free ends corresponding to the difference in voltage which is to be adjusted. Such coils are very inconvenient for transformers and other devices, which require a low short-circuit voltage, because a coil of such transformers must have the smallest possible thickness, whereas such small thicknesses can only be compensated by a corresponding increase in axial length. The two requirements are consequently contradictory and cannot be properly executed.

High voltage coils having the shape of coaxial cylinders and having an axial adjustment of the potential, which are known in prior art, have the disadvantage of creating contractions of the field at the three-cornered edges projecting into the coil. A contraction or a displacement of the field takes place between the last turn of a shorter cylinder and the adjacent longer layer situated either above or below it. Generally speaking, it is not possible with the known devices to have a complete mastery of the field, although the ends of the layers having a high potential are separated from the lowest potential by intermediate potentials.

These contractions or displacements of the field cannot be taken into account while designing a high voltage winding, as it is hardly possible to calculate them. Their main danger, however, lies in the practical experience that insulating materials arranged between the single winding layers usually cannot bear the strains and stresses which they cause.

An object of this invention is to eliminate the above-mentioned drawbacks by providing a high voltage winding wherein no such contractions or displacements of the field take place.

I propose to eliminate the displacements of the field or an intermixture of the field lines in the following manner:

A high voltage winding is usually composed of a plurality of layers, one following the other, the place where one layer terminates and the other begins, being called the connecting point of a pair of adjacent layers. This connecting point has a certain voltage which may also be designated as a potential with respect to earth. I provide a conductor and connect it with said connecting point. I prefer to employ a metal disc for this purpose, because then the entire space situated above said connecting point and between said point and the exterior circumference of the coil, has a potential equal to the potential of said connecting point. The metal disc should be provided with a slot in order not to create a short circuit. By means of the arrangement, I bring out the potential of the connecting point of each pair of adjacent layers radially to the circumference of the coil, so that the layers having a higher potential are separated from the lowest potential by the intermediate potentials of said conductors.

The exterior circumference of a coil may, therefore, have the general appearance of a plurality of metal discs situated at a certain distance from each other. Since each of the discs is connected with a different connecting point, it will have a different voltage which is only a fraction of the total voltage. If the innermost layer of the winding is earthed, the discs situated closest to the two ends of the coil will have the lowest voltage, and the voltage will increase towards the middle of the coil circumference. Thus I separate the total voltage of the winding into a plurality of partial voltages which are spread over the entire surface of the coil. In other words, I form a so-called potentially controlled cylindrical surface around the coil. Due to this arrangement, it is possible to connect the high voltage main directly with the first layer of the winding without using a powerful insulator. The exterior circumference of the coil may be effectively protected by covering it with an insulating cylinder of usual dimensions.

It is also possible to eliminate the above-mentioned metal discs and to replace them by the winding itself. I perform this in the following way:

After a layer has been wound in the direction of the coil axis, instead of proceeding to wind the next layer axially, I begin to wind the end of the layer-winding in the direction of a radius of the coil, until a disc-winding is produced. Then I lead the end of said disc-winding back to the wound layer, and proceed to wind the second layer axially. This method is repeated for each layer of the winding. The disc-winding produced by this method is a complete substitute for the above-mentioned metal discs.

The invention will appear more clearly from the following detailed description, when taken in connection with the accompanying drawings, which illustrate preferred embodiments of the inventive idea.

In the drawings:

Figure 1 shows diagrammatically and in section a high voltage coil with straight metal discs.

Figure 2 shows in section a coil having slotted metal discs arranged between disc-windings.

Figure 3 shows wires inserted within a spiral slot.

Figure 4 shows a pair of disc-windings used as a substitute for a disc-winding and a disc.

Figure 5 is a perspective view of metal members shown in section in Figure 2.

Figure 6 is a top view of the coil shown in Figure 2.

Figure 7 shows a device wherein the coil casing consists of the low voltage winding.

Figure 8 shows a device having two concentrical and symmetrical high voltage windings.

Figure 9 shows diagrammatically a cooling device to be used with high voltage windings according to this invention.

The coil shown in Fig. 1 comprises a plurality of layers situated one around the other and wound in the direction of the longitudinal axis of the coil. These layers are shown diagrammatically by wavy lines in the drawings, and two of them are designated by the numerals 5 and 6. The connecting points of each pair of adjacent layers are designated by the numeral 11. Each of these connecting points 11 is connected with one of the metal discs 12.

All the discs 12 have the shape of rings and the same external diameter. The inner diameters of said discs are different, that of the disc 12a, being smaller than the inner diameter of the disc 12b. As shown in Fig. 1, the inner diameter of a disc depends on the position of the corresponding connecting point 11. Each one of the discs is provided with a radial slot, as indicated diagrammatically in Fig. 1.

By connecting the discs 12 with the connecting points 11, the external circumference of the coil is provided with the potentials of the connecting points 11. If, for instance, the innermost layer is earthed, and the connecting point of this layer with the next one has a voltage of 1000 volts, then the disc 12a connected with this connecting point will also have a voltage of 1000 volts. This disc is situated near one of the external ends of the coil. If the difference in voltage between the adjacent connecting points is always 1000 volts, the disc which is connected with the second connecting point will have a voltage of 2000 volts. The last-mentioned disc is situated near the other external end of the coil. Then the third connecting point has 3000 volts and is connected with a disc 12b which is situated near the disc 12a. Thus the difference in voltage between two adjacent discs will always be 2000 volts.

The connecting points 11 may be connected with the discs 12 in any desired manner, for instance by connecting an end of the layer 5 of the winding to the disc 12b at a point close to its slot and by connecting the adjacent end of the next layer 6 with said disc at a point situated on the opposite side of the slot. Then the disc 12b is used as a turn of a winding and acts as a connecting point for the adjacent layers 5 and 6.

The insulation situated between the discs 12 must be sufficient to withstand a voltage double to that of the corresponding layer. It may be even stronger than that, because there is enough space in the direction of the coil axis for a stronger insulation. The discs 12 need not be made very thick and may consist of a plurality of conducting foils.

Figure 2 shows another modification wherein disc-windings 14 and discs 15 are used as a substitute for the metal discs 12 described in the previous modification. The coil shown in this figure comprises a plurality of tubular concentrical layers wound on a core 16 and surrounded by a casing 20, some of said layers being designated by numerals 1, 2 in the drawings. As soon as one of these tubular layers, for instance the layer 1, has been wound, I proceed to wind one of the ends of said layer spirally until a disc-winding 14 is produced. When the disc-winding 14 is completed, I bring the free end of the winding back to the layer 1 through a slot in a metal disc 15 and then I proceed to wind the next tubular layer 2 in a direction opposite to the direction in which the layer 1 has been wound. The end of the layer 2 is again wound in the form of a spiral until another disc-winding 14 situated at the opposite side of the coil is produced.

The coil shown in Fig. 2 comprises therefore a plurality of tubular layers 1, 2 and disc-windings 14. Metal discs 15 are situated between the disc-windings and the end of each disc-winding is led through a slot formed in a disc 15 to the next tubular layer as mentioned heretofore. Fig. 2 shows the discs 15 in a cross-section along a plane which passes partly through the slots formed in the discs, and partly through the bodies of the discs, as shown in the drawings.

The windings are surrounded by metal discs 16b, forming a part of the metal cylinder 16, and by a casing 20. The members 16 and 16b may be used as a turn of the low voltage winding. A main enters into the coil at 19 and is supported in an insulator 23, 24. The casing 20 is coated with a metal sheet 22. A core 21 is used to support the coil.

The metal disc inserted between two disc-windings may be provided with a spiral slot, which divides the disc into a plurality of turns. The wires may be wound spirally and in this form be arranged within the disc. This is illustrated in Fig. 3, which shows a disc 15e provided with a slot 12f containing a wire 15a. Then the wire 15a is led within said slot 12f from one layer-winding to the next layer-winding. The wire 15a may be connected at 12g with the disc 15e. This connection, however, is not essential because the disc 15e will have the same potential as the wire 15a, in any event, due to the fact that said disc and the wire 15a form the armature of a condenser.

The disc 15e may be replaced by a winding. This modification is shown in Figure 4 and it comprises the usual disc-winding 14a, which is wound in a direction towards the exterior until the desired diameter is reached. Then the end of the disc-winding 14a is wound as a second disc-winding 14e, which is placed close to the winding 14a, and, for all practical purposes, performs the same functions at the disc 15e shown in Fig. 3.

Fig. 5 is a perspective view of the metal members 16 and 16b, which have been shown in section in Fig. 2, and illustrates spiral slots with which said members are provided.

Figure 6 is a top view of the coil shown in Fig. 2 and shows the insulator 23, the metal covering 22 and concentric rings 22a, which form a part of said covering.

Owing to the fact that the winding up to the end of its first layer has only a small difference in voltage with respect to the initial potential, it can be wound on the slotted metal casing 16, shown in Figures 2 and 5. The casing 16 holds the coil together and protects it from tearing to pieces during a short-circuit. The casing 16 may also be used as a one-layer low-voltage winding of a transformer, provided that it surrounds an iron core 21, as shown in Figure 2. In this arrangement the amount of stray voltage is very small and the short circuit voltage also is kept very low. If more than one low voltage winding is needed, the tube of the metal casing 16 may be helically cut up and the flanges 16b may have the form of a spiral, as shown in Fig. 5. A coil casing cut up in this fashion represents then the low voltage winding.

In the device shown in Figure 7, a reverse method has been used and the coil casing has been produced directly out of the low voltage winding consisting of shaped wire 17. This wire may have a shape which is similar to that used for a metal hose so that the several parts of the wire may be interengaged. To facilitate the construction of such a coil casing, the windings may be wound on a carrier 18 consisting of insulating material or metal provided with a covering made of insulating material. The carrier may have the form of a rack or comb and thus provide grooves for keeping the individual turns at a certain distance apart. The ends of the carrier may also, if necessary, have the shape of tongs and hold the turns which form the flange of the coil box. The coil casing produced in this way may be immersed together with the carrier into an insulating varnish or enamel until a degree of insulation necessary for the turn voltage has been reached and also until the insulation can hold out the difference of voltage with respect to the first high-voltage layer winding. This process should be continued until the intermediate spaces are completely filled in and until the turns together with the insulation form a rigid coil casing which is able to withstand electrical and mechanical strains, the high voltage coil being brought into this casing in the above-described way.

In this case the high voltage coil is surrounded on three sides and the voltage is taken out at the fourth open side, approximately in the middle of the exterior circumference. The voltage drops in the direction of the two coil casing flanges at the rate of the prevailing double layer voltage. The danger of burning out due to dust is also diminished owing to this stapled distribution of voltage. It is known to those versed in the art that small particles of dust and fibers assume a straight position on uncovered metal parts owing to action of electrostatic forces, and they become saturated with dampness and form sharp points which lead to a so-called formation of clouds of ions, when boosting voltage waves appear, said ion clouds leading to a puncture. For that reason the radial metal discs 12 are provided on all sides with an insulating coating which must be strong enough to bear the instant double difference of layer voltages. The entering turn 19, which lies in the middle on the exterior circumference, is also provided with a similar insulating layer. If the entering turn 19 is made comparatively wide, the reflexions of the wandering waves are flattened out to a very great extent by the capacity of the turn layers with respect to each other and the inserted radial metal discs 12. The whole coil casing is immersed in insulating varnish to obtain a smooth surface for the high voltage coil and thus to prevent a liquid from penetrating into it. However, dampness would do only little damage in this case because there are no places where considerable differences of voltage and contractions of the field prevail, and where dampness, oil or dust could be harmful. Nevertheless it is possible to surround the coil with an insulating tubular jacket, especially suited for those coils which stand in air, in a gas or in sand and are not immersed in an insulating liquid. The high voltage is then led through in a place in the middle of the tube circumference. With respect to this arrangement it should be noted that the potential of the interior jacket surface of the insulating casing 20 (Fig. 2) is adjusted on both sides in an axial direction by the high voltage winding situated below it. This is particularly necessary when the coil casing 16 is arranged on an iron core 21 (Fig. 2) and when the radial voltage difference of the end potential with respect to the iron core having nearly the initial potential is not to be balanced by a correspondingly greater distance. The necessity arises in the case of three-phase transformers, when the difference in voltage between the phase windings is not balanced by a greater distance, or when potential leading sheets are arranged in the intervening space at the winding points for high voltage.

If it is necessary to keep this distance very small, the insulating casing 20 may be provided with a metal layer 22 at its external circumference and an insulator 23 made out of the same piece as the insulating jacket 20 may be used for transmitting the high voltage as shown in Fig. 2. In that case the metal layer 22 reaches to the lower cavity of the projection 24 of the insulator 23, so that the potentials led out of the high voltage winding are perpendicular to the metal 22, having approximately the initial potential. Field contractions are thus eliminated in this case also.

The insulator 23 shown in vertical section in Figure 2 is again shown in top view in Figure 6. As illustrated in Figs. 2 and 6, the lower part of the insulator 23 is covered by a metal foil or metal coating 22. I prefer not to make the metal coating out of one piece, but to subdivide it into a number of separate sheets or pieces 22a, which, as shown in Figure 6, have the shape of concentrical rings. In the modification shown in the drawings these metal rings lie on the surface of the insulator 23 and are not directly connected with the corresponding high voltage potentials.

Figure 8 shows a construction which eliminates the necessity of protecting the exterior circumference of the high voltage winding by a large quantity of insulation. This device comprises the coil carrier or bobbin 16, carrying a coil 25. The coil 25 consists of a plurality of superposed layer windings 25a, disc windings 25b and discs 25c. The coil is wound as follows:

As soon as a layer winding 25a is completed, the wire forming a continuation of this winding is wound in the form of a disc winding 25b. The free end of said disc winding is electrically connected with a disc 25c. Then another layer winding is wound on the top of the first-mentioned layer winding and one of its ends is connected with the same disc 25c, while the wire at the opposite end thereof is again wound in the form of a disc winding. This operation is repeated until the coil 25 is completed. One end of the coil 25 is attached to a wall of the bobbin 16 and is preferably earthed, while the opposite end is connected with the entrance turn 19b of the high voltage main, which is situated in the middle of the bobbin 16. The high voltage main is carried by a cylindrical insulator 32 having a tapered end adjacent to the entrance turn 19b.

Figure 8 shows that only about one half of the available space within the bobbin 16 is occupied by the coil 25. The major portion of the remaining space is occupied by a coil 26 which is separated by a gap 27 from the coil 25 and is substantially similar to said coil, since it also comprises layer windings 26a and 26a', disc windings 26b and discs 26c. The coil 26 surrounds the coil 25, and the discs 26c and the disc windings 26b of the coil 26 are situated opposite the discs 25c and the disc-windings 25b of the coil 25.

The insulator 32 consists, preferably, of tubular layers of insulating material, such as impregnated cardboard, separated from each other by tubular metal foils 33. As shown in Fig. 8, the tubular metal foils 33 have a common central axis which coincides with the central axis of the cylindrical insulator 32 and is perpendicular to the central axis of the tubular layer windings 26a or 25a.

An insulating ring 34 is also located within the bobbin 16. As shown in Fig. 8, the cross-section of the ring 34 is equal and similar in shape to the cross-section of the tapered portion of the insulator 32. The ring 34 is carried by the casing and maintains the entrance turn 19b in its proper position within the bobin 16. The ring 34 must have a gap sufficient to admit the tapered portion of the insulator 32, said tapered portion forming a continuation of the ring 34.

The ring 34 consists, preferably, of annular and concentrical layers of insulation which are separated from each other by annular and concentrical metal foils 33a. The common central axis of the metal foils 33a coincides with that of the ring 34 as well as with the central axis of the layer windings 26a and 25a. The edges of the metal foils 33a may project beyond the ring 34, while the edges of the metal foils 33 may project beyond the tapered portion of the insulator 32.

The coil 26 is wound in the following manner: One end of a wire is connected with the entrance turn 19b of the high voltage main and then the wire is wound in the form of a disc-winding 26b until said disc-winding reaches certain predetermined dimensions. Then the end of the disc-winding is wound in the form of a layer-winding 26a until it comes up to the ring 34 and the tapered end of the insulator 32. The adjacent end of the layer-winding may be connected with one of the metal sheets 33 situated within the insulator 32. However, the last turn which forms a part of the layer-winding and which is adjacent to the ring 34 may be connected with one of the metal foils 33a situated within said ring. In the modification illustrated in Figure 8, the layer windings are connected with the metal foils 33 of the insulator 32.

The layer-winding 26a is continued at the opposite side of the ring 34 and the tapered end of the insulator 32 and is designated by the reference 26a' in Fig. 8. The adjacent end of the layer-winding 26a' is connected with the same metal foil 33 with which the layer-winding 26a is connected. The opposite end of the layer-winding 26a' is connected with a metal disc 26c. Another disc-winding 26b is connected with the opposite end of the disc 26c, and is also connected with another layer-winding which is wound on top of the layer-winding 26a' and which is connected with another one of the metal foils 33. The same winding operations are repeated at both sides of the ring 34 until the coil 26 is completed. The free end of the topmost layer-winding of the coil 26 is connected with the metal bobbin 16. This topmost layer-winding is covered by a cover 35 which is connected with the bobbin 16.

As shown in Figure 8, the free end of the topmost layer-winding of the coil 26, as well as the free end of the lowest layer-winding of the coil 25, are both connected with the metal bobbin 16; the two other free ends of the coils 25 and 26 are connected with the entrance turn 19b. Consequently, the coils 25 and 26 are connected in parallel with each other. When large amounts of heat are to be compensated, as is the case with power transformers, natural cooling is not sufficient any more, so that special cooling means, for instance, those shown in Fig. 9, must be used. In the drawings, the discs 12 have the shape of hollow rings and are interconnected in series by means of tubes 36, which are made of insulating material, such as rubber. The discs 12 are, therefore, connected with each other by means of these tubes not electrically, but merely for the purpose of transmitting a cooling medium through said discs. Compressed air or any desired liquid or gaseous substance is led through the device by pressure, this substance cooling the device either to normal temperature or below it. I prefer to use a high pressure, and employ the cold of expansion for compensating the heat.

Hollow discs 12 arranged between the radial disc coils and serving as a continuation of the layer coils take the heat out of these coils, said heat being transmitted to them from the winding itself. The direction of travel of the cooling substance should be chosen in such a way that it flows in accordance with the increasing voltage of the winding, i. e., from right (connecting member 37) and left towards the interior to the hollow entrance winding 19. The hollow entrance winding must have a length which approximately corresponds to the length of the layer windings to enable it to transmit heat out of the layer windings. It is provided with an outlet 38 for the cooling substance, which is either led out or blown out of this opening, formed by a tube 39 which may be used at the same time as a connection for high voltage, if the tube is made out of metal. If the device is surrounded by an insulating jacket 20, the tube must be protected by the insulator 23 or 32. To prevent the blown cooling air from whistling at a high outlet velocity, the opening should have the form of a funnel.

Finally, it is possible to make the low voltage winding itself hollow, provided that it forms the coil body as shown in Figure 7, and thus transmits the heat generated in the low voltage coil and also a part of the heat of the high voltage coil situated above it. All of the low voltage windings may be connected in series with respect to the air flow, or some of them may be connected in parallel due to the small difference of temperature between the entrance and the exit of the cooling medium.

If the high voltage coil made according to this invention or the iron core 21 supporting the same are installed on insulators 21a, shown in Fig. 8, the initial potential or the earth may be connected with the entering layer 19 and the high voltage may be connected with the innermost winding layer. The voltage is then distributed in a reversed order to the described distribution.

What is claimed is:

1. A high voltage coil, especially for transformers, choking coils and measuring instruments, comprising a coil having a plurality of superposed interconnected layer-windings; and means forming a part of the external surface of said coil and connected with said layer-windings at least some of the connecting points of two adjacent layers, said means bringing the potentials of said connecting points to the circumference of the coil.

2. A high voltage coil, especially for transformers, choking coils and measuring instruments, comprising a plurality of interconnected layer-windings, and a plurality of metal discs connected with the connecting points of each two adjacent layers for radially bringing out the potentials of said connecting points to the circumference of the coil.

3. A high voltage coil, especially for transformers, choking coils and measuring instruments, comprising a plurality of interconnected layer-windings, and a plurality of hollow metal discs connected with the connecting points of each two adjacent layers for radially bringing out the potentials of said connecting points to the circumference of the coil.

4. A high voltage coil, especially for transformers, choking coils and measuring instruments, comprising a plurality of interconnected layer-windings, and means for radially bringing out the potentials of the connecting points of two adjacent layers to the circumference of the coil, said means comprising disc-windings connected with said layer-windings.

5. A high voltage coil, especially for transformers, choking coils and measuring instruments, comprising a plurality of interconnected layer-windings and means for radially bringing out the potentials of the connecting points of two adjacent layers to the circumference of the coil, said means comprising a slotted disc and disc-windings connected with said layer-windings, one end of one of said disc-windings being connected with an end of one of said layer-windings through a slot formed in said disc.

6. A high voltage coil, especially for transformers, choking coils and measuring instruments, comprising a plurality of interconnected layer-windings, and means for radially bringing out the potentials of the connecting points of two adjacent layers to the circumference of the coil, said means comprising a slotted disc and disc-windings connected with said layer-windings, one end of one of said disc-windings being connected with an end of one of said layer-windings through a slot formed in said disc, said disc being connected with and forming a turn of said disc-winding.

7. A high voltage coil, especially for transformers, choking coils and measuring instruments, comprising a plurality of interconnected layer-windings, and means for radially bringing out the potentials of the connecting points of two adjacent layers to the circumference of the coil, said means comprising two interconnected disc-windings which are connected with one of said layer-windings, one of said disc-windings being wound in a direction opposite to the direction of winding of the other disc-winding.

8. In a device of the character described, a plurality of interconnected layer-windings forming a high voltage coil, means for radially bringing out the potentials of the connecting points of two adjacent layers to the circumference of the coil, and a low voltage coil in inductive relation to said high voltage coil, said low voltage coil being composed of shaped wires and surrounding said high voltage winding on three sides.

9. In a device of the character described, a plurality of interconnected layer-windings forming a high voltage coil, means for radially bringing out the potentials of the connecting points of two adjacent layers to the circumference of the coil, a low voltage coil in inductive relation to said high voltage coil, and flanges acting as additional turns of said low voltage coil, said flanges being situated on both sides of said high voltage coil.

10. A high voltage coil, especially for transformers, choking coils and measuring instruments, comprising a plurality of interconnected layer-windings, means for radially bringing out the potentials of the connecting points of two adjacent layers to the circumference of the coil, an insulator surrounding said coil, a metal coating on the exterior surface of said insulator, and an insulated tube connected with said insulator, said tube providing an access to the end potential of said coil.

11. In a device of the character described, a plurality of interconnected layer-windings forming a high voltage coil, and means for bringing out the potentials of the connecting points of two adjacent layers to the circumference of the coil, said high voltage coil comprising two separate coils, one of which is arranged concentrically to and symmetrically with the second one, parts of the two coils having the same potential being arranged opposite each other.

12. In a device of the character described, a coil comprising a plurality of interconnected layer windings, means for bringing out the potentials of the connecting points of two adjacent layers to the circumference of the coil, an insulator arranged partly within the layer-windings, another insulator similar in shape to a part of the first-mentioned insulator, the second-mentioned insulator being also situated within said layer-windings, and means within said two insulators for interconnecting the adjacent ends of said layer-windings.

13. In a device of the character described, a coil comprising a plurality of interconnected layer-windings, means for bringing out the potentials of the connecting points of two adjacent layers to the circumference of the coil, an insulator arranged partly within the layer-windings, another insulator similar in shape to a part of the first-mentioned insulator, the second-mentioned insulator being also situated within said layer-windings, and metal strips within said two insulators, said metal strips being connected with said layer-windings, the amount of said metal strips corresponding to the amount of said layer-windings.

14. In a device of the character described, a coil comprising a plurality of interconnected layer windings, means for bringing out the potentials of the connecting points of two adjacent layers to the circumference of the coil, an insulator arranged partly within the layer-windings, another insulator similar in shape to a part of the first-mentioned insulator, the second-mentioned insulator being also situated within said layer-windings, and metal strips within the second-mentioned insulator, said metal strips being connected with at least some of said layer-windings and acting as additional turns of said windings.

15. In a transformer or the like, a coil comprising a plurality of interconnected layer-windings, means for bringing out the potentials of at least some of the connecting points of two adjacent layers to the circumference of the coil, said means comprising hollow metal discs, and insulating means connecting said hollow metal discs with each other.

16. In a transformer or the like, a coil comprising a plurality of interconnected layer-windings, a hollow entrance turn connected with one of said layer-windings, a tubular high voltage lead connected with said hollow entrance turn, means for bringing out the potentials of at least some of the connecting points of two adjacent layers to the circumference of the coil, said means comprising hollow metal discs, and insulating tubular means connecting said hollow metal discs with each other.

FRANZ JOSEPH FISCHER.